(12) United States Patent  
Komine

(10) Patent No.: US 6,739,810 B2
(45) Date of Patent: May 25, 2004

(54) TOOL HOLDER

(75) Inventor: Tsuyoshi Komine, Hyogo (JP)

(73) Assignees: Big Alpha Co. Inc., Hyogo (JP); Big Daishowa Seiki Co., Ltd., Higashi-Osaka (JP)

( * ) Notice: Subject to any disclaimer, the term of this patent is extended or adjusted under 35 U.S.C. 154(b) by 0 days.

(21) Appl. No.: 10/147,429

(22) Filed: May 16, 2002

(65) Prior Publication Data

US 2003/0223837 A1 Dec. 4, 2003

(30) Foreign Application Priority Data

Nov. 1, 2001 (JP) ........................................ 2001-336797

(51) Int. Cl.[7] ............................................. B23B 31/117
(52) U.S. Cl. .................. 409/234; 409/232; 408/239 R; 408/238 A
(58) Field of Search ................ 409/234, 232; 408/239 R, 239 A, 238, 238 A; 279/102, 103

(56) References Cited

U.S. PATENT DOCUMENTS

| 4,643,623 A | * | 2/1987 | Kondo et al. ............... 409/232 |
| 4,808,049 A | * | 2/1989 | Cook ......................... 409/234 |
| 4,850,765 A | * | 7/1989 | Ramunas .................... 409/234 |
| 4,939,834 A | * | 7/1990 | Kawasaki et al. ............ 483/3 |
| 5,110,240 A | * | 5/1992 | Zeilinger et al. ........... 409/234 |
| 5,114,286 A |   | 5/1992 | Calkins |
| 5,311,654 A | * | 5/1994 | Cook ......................... 29/447 |
| 5,593,258 A | * | 1/1997 | Matsumoto et al. ......... 409/234 |
| 5,775,857 A |   | 7/1998 | Johne |
| 5,873,687 A | * | 2/1999 | Watanabe .................... 409/234 |
| 5,971,681 A | * | 10/1999 | Wolfe et al. ................ 409/233 |
| 6,224,303 B1 | * | 5/2001 | Wheeler et al. ......... 408/239 R |
| 6,224,306 B1 | * | 5/2001 | Hiroumi et al. ............ 409/234 |
| 6,352,395 B1 | * | 3/2002 | Matsumoto et al. ......... 409/234 |
| 6,394,466 B1 | * | 5/2002 | Matsumoto et al. ......... 279/103 |
| 6,425,716 B1 | * | 7/2002 | Cook ........................ 408/145 |
| 2001/0013266 A1 |  | 8/2001 | Isaksson |

FOREIGN PATENT DOCUMENTS

| DE | 299 10 468 U1 | 8/2000 |
| GB | 2 004 478     | 4/1979 |
| JP | 07 096 436    | 4/1995 |

* cited by examiner

Primary Examiner—A. L. Wellington
Assistant Examiner—Dana Ross
(74) Attorney, Agent, or Firm—Wolf, Greenfield & Sacks, P.C.

(57) ABSTRACT

A tool holder is provided which enables the coupling of a tool holder body, regardless of the size of its outside diameter, to a tapered shank, which is hardly influenced by centrifugal force generated at the time of high-speed rotation, and which can cause elastic deformation of the tapered shank effectively. The tool holder comprises the tapered hollow shank mounted on a machine tool spindle and the tool holder body coupled to the tapered shank. The tapered shank and the tool holder body are coupled to each other in the state where a part of the tapered shank is inserted in the tool holder body.

16 Claims, 4 Drawing Sheets

TOOL HOLDER

BACKGROUND OF THE INVENTION

1. Field of the Invention

The present invention relates to a tool holder which holds various tools and which is mounted on, for example, a machine tool spindle.

2. Description of the Related Art

A conventional tool holder includes, for examples, a tool holder body for holding tools and a tapered shank mounted on a machine tool spindle or the like. When this tool holder is mounted on the machine tool spindle or the like, the tapered shank is brought into engagement with a tapered hole in the machine tool spindle. At this time, the outer surface (outer boundary surface) of the tapered shank has to be brought into close contact with the inner surface (inner boundary surface) of the tapered hole. Accordingly, the tool holder is structured in such a manner that in order to realize secured close contact (or engagement) of the tapered shank with the tapered hole, the tapered shank is formed with a hollow and is thus capable of diameter contraction by means of elastic deformation, and the tapered shank, the diameter of which has contracted, has the property of returning to the original state after the engagement with the tapered hole. The use of this tapered hollow shank also makes it possible to reduce the weight of the tool holder.

Concerning the conventional tool holder having such a tapered hollow shank, the tool holder body and the tapered shank are normally composed as separate units, and the tool holder is structured in such a manner that a flange formed at one end (on the side opposite to the tool insertion hole side) of the tool holder and a flange formed at one end (on the tool insertion hole side) of the tapered shank are placed side by side and are then joined with bolts.

Examples of a tool holder having such a tapered hollow shank include British Patent Publication No. GB2004478A and Japanese Patent Laid-Open (Kokai) Publication No. HEI 7-96436.

However, since the flanges of the conventional tool holder having the above-described tapered hollow shank are secured by using bolts, if the outside diameter of the tool holder body is larger than that of the tapered shank, it is difficult to place the flanges side by side and it is impossible to join them together.

Moreover, even if the tapered hollow shank can deform elastically, it is difficult to cause the flange to do this, thereby resulting in difficulty in causing optimal elastic deformation of the tapered shank. Accordingly, there is a possibility that it may become difficult to bring the tapered shank into secured close contact (or engagement) with the tapered hole in the machine tool spindle. Therefore, it is sometimes necessary to notch the tapered hole of the machine tool spindle or to notch the flange of the tapered shank.

SUMMARY OF THE INVENTION

The aim of the present invention is to improve the above-described conventional tool holder. It is an object of this invention to provide a tool holder which allows a tool holder body to be coupled to a tapered shank even if the outer diameter of the tool holder body is larger than that of a flange of the tapered shank, and which is hardly influenced by centrifugal force generated at the time of high-speed rotation, and which can cause elastic deformation of the tapered shank effectively.

In order to achieve this object, this invention provides a tool holder comprising: a tapered hollow shank mounted on a machine tool spindle; and a tool holder body coupled to the tapered shank; wherein the tapered shank and the tool holder body are coupled to each other in the state where a part of the tapered shank is inserted into the tool holder body.

Since in the tool holder having the above-described structure the tapered shank and the tool holder body are coupled to each other in the state where a part of the tapered shank is inserted into the tool holder body, even if the outside diameter of the tool holder body is larger than that of the tapered shank, it is possible to couple the tool holder body to the tapered shank. Moreover, since thick flanges or the like which are used in the conventional tool holder and which hardly deform elastically are not used in this invention for the coupling of the tapered shank and the tool holder body, it is possible to effectively cause the elastic deformation of the tapered shank. Therefore, the tapered shank also has a damping effect. Furthermore, since the tapered shank and the tool holder body are securely coupled to each other, even if, for example, centrifugal force generated at high-speed rotation acts on them, such centrifugal force will have no adverse effect on the integrated state of the tapered shank and the tool holder body.

A coupling part for coupling the tool holder body to the tapered shank can comprise a guiding part for positioning the tool holder body relative to the tapered shank and an attaching part for attaching the tool holder body to the tapered shank.

The guiding part can be located on the tapered shank insertion side of the tool holder body, and the attaching part can be located at a position on the inner surface of the tool holder body further away from the tapered shank insertion side compared to the guiding part. With this structure, the attaching part can be located at a position at a maximum distance from the part of the tapered shank to be placed in a tapered hole formed in the machine tool spindle. Accordingly, it is possible to cause the elastic deformation of the tapered shank more effectively.

The attaching part can comprise: a first screw part formed on the inner surface of the tool holder body, and a second screw part formed on the outer surface of the tapered shank for engaging with the first screw part.

Moreover, the attaching part may be fixed by means of, for example, welding, brazing, or bonding, to secure the inner surface of the tool holder body and the outer surface of the tapered shank, both of which constitute the attaching part.

It is possible to construct the tool holder by using different materials for the tapered shank and for the tool holder body. This makes it possible to bring the tapered shank into close contact with the tapered hole in the machine tool spindle with further certainty even if great centrifugal force is generated at the time of high-speed rotation of the machine tool spindle.

Furthermore, it is possible to employ the setting so that the specific gravity of the material for the tapered shank is greater than that of the material for the tool holder body.

By forming the tool holder body and the tapered shank as separate units, it is possible to manufacture them respectively by using optimal materials.

DETAILED DESCRIPTION OF THE PREFERRED EMBODIMENTS

Tool holders according to embodiments of the present invention are hereinafter described with reference to the attached drawings.

(Embodiment 1)

Figure 1:
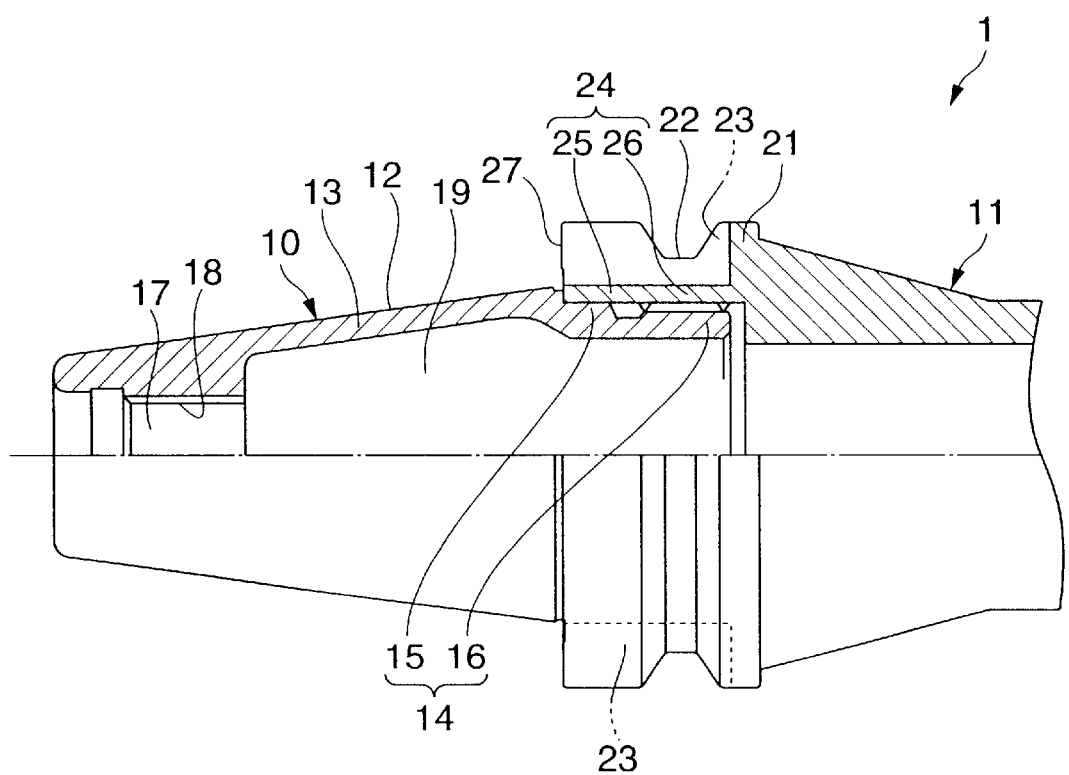
FIG. 1 is a partially sectional view of a tool holder according to Embodiment 1 of this invention.
Figure 2:
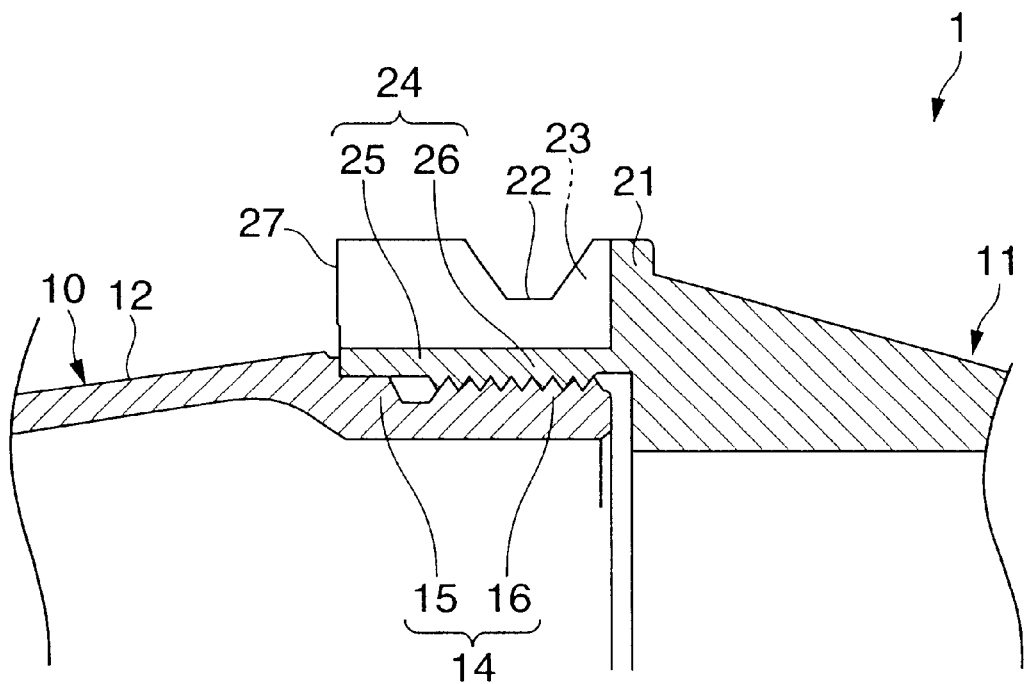
FIG. 2 is an enlarged sectional view of a part of the tool holder of FIG. 1 in the vicinity of a coupling part thereof.
Figure 3:
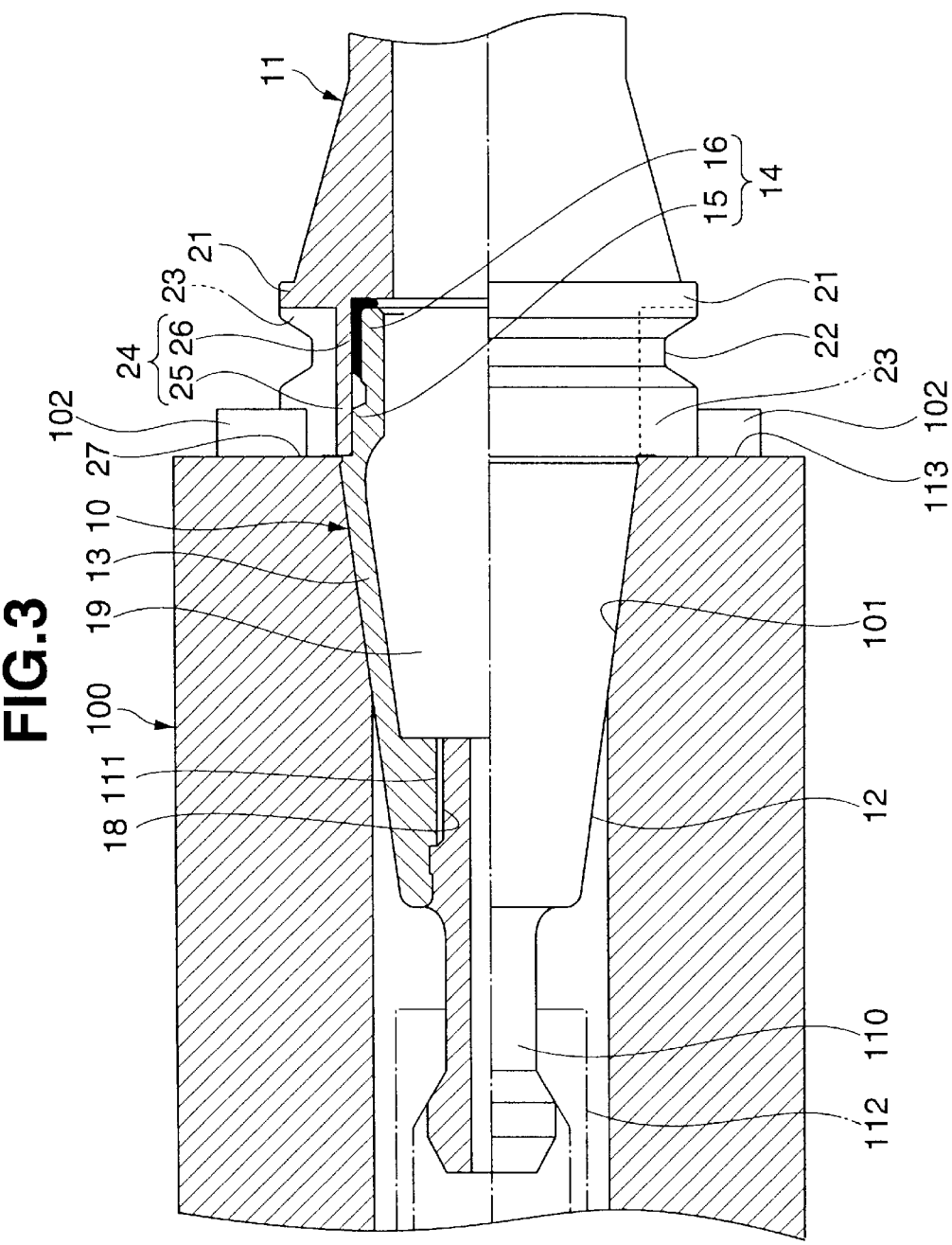
FIG. 3 is a partially sectional view of the tool holder of FIG. 1 in the state where it is attached to a machine tool spindle.

FIG. 1 is a partially sectional view of a tool holder according to Embodiment 1 of this invention. FIG. 2 is an enlarged sectional view of a part of the tool holder of FIG. 1 in the vicinity of a coupling part thereof. FIG. 3 is a partially sectional view of the tool holder of FIG. 1 in the state where it is attached to a machine tool spindle.

As shown in FIGS. 1 through 3, a tool holder 1 according to Embodiment 1 comprises: a tapered hollow shank 10 mounted on a machine tool spindle 100; and a tool holder body 11 coupled to the tapered shank 10.

The tapered shank 10 comprises: a tapered part 13 which has an outer surface 12 formed in a tapered shape corresponding to (or complementary to) the inner surface of a tapered hole 101 in the machine tool spindle 100; and a coupling part 14 substantially in a cylindrical shape which is integrated with the tapered part 13 on the tool holder body 11 side.

The outside diameter of the coupling part 14 is slightly smaller than the maximum outside diameter of the tapered part 13, and the coupling part 14 is inserted into the tool holder body 11 described later. On the outer surface of the coupling part 14 on its tapered part 13 side is formed a guiding part 15, while on the outer surface of the coupling part 14 on the tool holder body 11 side and adjacent to the guiding part 15 is formed a screw part 16 as an attaching part. The guiding part 15 serves as a guide for coupling the tapered shank 10 to the inside of the tool holder body 11 and also plays a role in centering in order to maintain the concentric arrangement of the tool holder body 11 with the tapered shank 10. Accordingly, the tool holder body 11 is positioned relative to the tapered shank 10. Moreover, the screw part 16 is formed so as to engage with a screw part 26 formed on the inner surface of the tool holder body 11 as described later.

On the machine tool spindle 100 side of the tapered shank 10 is formed an insertion hole 17 for inserting one end of a pull stud 110. On the inner surface of the insertion hole 17 is formed a female screw part 18 for engaging with a male screw part 111 of the pull stud 110.

This tapered shank 10 has a hollow 19 inside thereof. This structure enables weight reduction and also makes it possible to cause the diameter contraction of the tapered shank 10 by means of elastic deformation. The tapered shank, the diameter of which has contracted, tends to return to its original state. This action enables the tapered shank 10 to enter into secured close contact (or engagement) with the tapered hole 101.

In Embodiment 1, the tapered shank 10 is made of maraging steel. The specific gravity of this maraging steel is 8.05.

At one end of the tool holder body 11 on the side into which the tapered shank 10 is inserted, a jaw part 21 is formed. A tool not shown in the drawings is held and secured at the tool inserting part of the tool holder body 11 on the side opposite the jaw part 21. On the outer surface of the jaw part 21 is formed a groove 22 to be held by a well-known manipulator. Around the circumference of the jaw part 21 are formed engagement concaves 23 evenly spaced at an angle of 180° for engaging with drive keys 102 of the main tool spindle in order to cause the tool holder 1 to rotate in an integrated manner with the machine tool spindle 100. On the inner surface of the jaw part 21 is formed a coupling part 24 to be coupled to the coupling part 14 of the tapered shank 10. On the tapered shank 10 side of this coupling part 24 is formed a guiding part 25. On the tool insertion hole side (further inside of the tool holder body 11 than the position of the guiding part 25) of the coupling part 24 and adjacent to the guiding part 25 is formed a screw part 26 for engaging with the screw part 16.

The guiding part 25 contacts the guiding part 15 and serves as a guide for coupling the tapered shank 10 to the inside of the tool holder body 11 and also plays a role in centering in order to maintain the concentric arrangement of the tool holder body 11 with the tapered shank 10.

In Embodiment 1, the tool holder body 11 is made of alloy steel. The specific gravity of this alloy steel is 7.8, which is smaller than the specific gravity of maraging steel which composes the tapered shank 10.

In order to assemble the tool holder 1 having the above-described components, the coupling part 14 of the tapered shank 10 is first inserted into the coupling part 24 of the tool holder body 11 to cause the screw part 16 to engage with the screw part 26. At this time, the existence of the guiding parts 15 and 25 allows the tool holder body 11 and the tapered shank 10 to move in concert with each other and causes the tool holder body 11 to be placed concentrically with the tapered shank 10 so that the concentric arrangement is maintained. Accordingly, the tool holder body 11 is coupled to the tapered shank 10 securely and with a high degree of precision. Regarding this coupling, it is possible to fix the screw parts 16 and 26 by, for example, brazing or applying an adhesive between the screw parts 16 and 26. This makes the tapered shank 10 and the tool holder body 11 couple to each other more firmly.

A contact area between an end face 27 of the tool holder body 11 and the tapered shank 10 may be left as it is or be fixed by means of, for example, welding, brazing, or applying an adhesive.

The tool holder 1 having the above-described structure is constructed in such a manner that the tool holder body 11 and the tapered shank 10 are coupled to each other in the state where one end (that is, the coupling part 14) of the tapered shank 10 on its tool insertion hole side is inserted into the tool holder body 11. Accordingly, even if the outside diameter of the tool holder body 11 is larger than that of the tapered shank 10, it is possible to couple the tool holder body 11 to the tapered shank 10.

Since no thick member (such as a flange) which hardly deforms elastically is used at the time of coupling of the tool holder body 11 to the tapered shank 10, it is possible to cause the elastic deformation of the tapered shank 10 effectively.

Moreover, since the tapered shank 10 and the tool holder body 11 are securely coupled to each other, for example, even if centrifugal force generated at high-speed rotation acts on them, such centrifugal force will have no adverse effect on the integrated state of the tapered shank 10 and the tool holder body 11.

Furthermore, since the specific gravity of the material for the tapered shank 10 is larger than that of the material for the tool holder body 11, even if large centrifugal force is generated at the time of high-speed rotation of the machine tool spindle 100, it is possible to more securely bring the tapered shank 10 into close contact with the coupling part 24 of the tool holder body 11 and the tapered hole 101 in the machine tool spindle 100.

In order to attach the tool holder 1 to the machine tool spindle 100, the pull stud 110 is first inserted into the insertion hole 17 formed in the tapered shank 10 and the male screw part 111 formed on the outer surface of the pull stud 110 is caused to engage with the female screw part 18 formed on the inner surface of the insertion hole 17, thereby securing the pull stud 110 at the tapered shank 10. As indicated by alternate long and short dashed lines in FIG. 3, this pull stud 110 is designed to engage with a pulling member 112 on the machine tool spindle 100 side.

As the groove 22 in the tool holder body 11 is held by a manipulator not shown in the drawings, the tapered shank 10 of the tool holder 1 is inserted into the tapered hole 101 in the machine tool spindle 100, so that the pulling member 112 engages with the pull stud 110, thereby causing the tapered shank 10 to be mounted at the machine tool spindle 100 as if the tapered shank 10 is pulled toward the inside of the machine tool spindle 100. This causes the end face 27 of the jaw part 21 on the machine tool spindle 100 side to contact the end face 113 of the machine tool spindle 100 and also causes the outer surface 12 of the tapered shank 10 to contact the inner surface of the tapered hole 101 in the machine tool spindle 100, thereby causing the tool holder 1 to be firmly attached to the machine tool spindle 100 by means of simultaneous dual contact.

At this time, for example, even if a gap is created between the end face 27 and the end face 113 as the outer surface 12 of the tapered shank 10 contacts the inner surface of the tapered hole 101 in the machine tool spindle 100 before the end face 27 of the jaw part 27 contacts the end face 113 of the machine tool spindle 100 because of machining inaccuracy in the manufacturing process, the pull stud 110 forces the tapered shank 10 to be pulled toward the inside of the machine tool spindle 100. Accordingly, the tapered shank 10 is pressed by the inner surface of the tapered hole 101, thereby deforming elastically and contracting its diameter. This diameter contraction enables the tapered shank 10 to move toward the inside of the tapered hole 101, and the end face 27 of the jaw part 21 contacts the end face 113 of the machine tool spindle 100 and, at the same time, the outer surface 12 of the tapered shank 10 securely contacts the inner surface of the tapered hole 101.

In Embodiment 1, the case in which the tapered shank 10 is made of maraging steel and the tool holder body 11 is made of alloy steel is explained. However, without limitation to such example, if the tool holder body 11 is made of alloy steel, examples of material (for the tapered shank 10) with greater specific gravity than that of the alloy steel include high-nickel stainless steel.

Although it is a desired condition that the specific gravity of the material for the tapered shank 10 be greater than that of the material for the tool holder body 11, it is not an essential condition for the present invention.

(Embodiment 2)

A tool holder according to Embodiment 2 of this invention is hereinafter described with reference to the relevant drawing.

Figure 4:
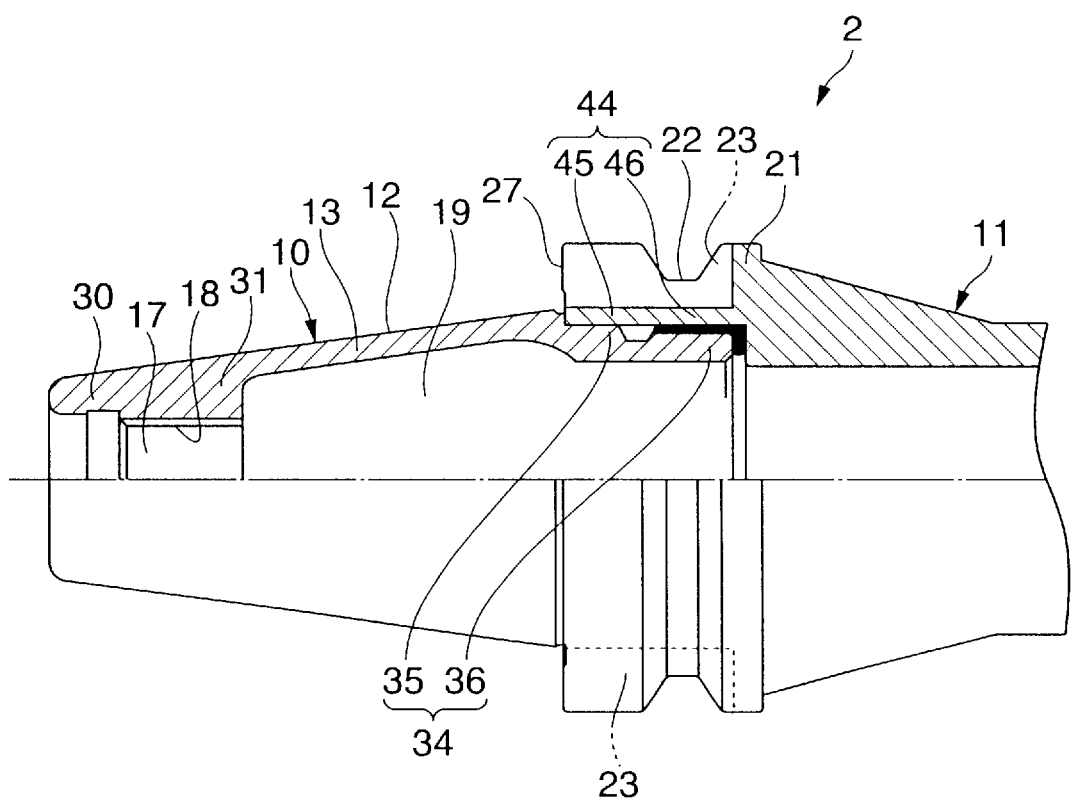
FIG. 4 is a partially sectional view of a tool holder according to Embodiment 2 of this invention.

FIG. 4 is a partially sectional view of the tool holder according to Embodiment 2. The elements of Embodiment 2 similar to those explained in Embodiment 1 are given the same reference numerals, and any detailed description thereof is omitted.

As shown in FIG. 4, a tool holder 2 of Embodiment 2 is different from the tool holder 1 of Embodiment 1 in the structure of coupling parts 34 and 44.

The tapered shank 10 comprises a coupling part 34 substantially in a cylindrical shape which is integrated with the tapered part 13 on the tool holder body 11 side. The outside diameter of the coupling part 34 is slightly smaller than the maximum outside diameter of the tapered part 13, and the coupling part 34 is inserted in the tool holder body 11 in the same manner as in Embodiment 1. On the outer surface of the coupling part 34 on the tapered part 13 side is formed a guiding part 35, while on the outer surface of the coupling part 34 on the tool holder body 11 side and adjacent to the guiding part 35 is formed an attaching part 36.

On the inner surface of the jaw part 21 of the tool holder body 11 is formed a coupling part 44 to be coupled to the coupling part 34 of the tapered shank 10. On the tapered shank 10 side of this coupling part 44 is formed a guiding part 45. On the tool insertion hole side (further inside of the tool holder body 11 than the position of the guiding part 45) of the coupling part 44 and adjacent to the guiding part 45 is formed an attaching part 46.

In order to assemble the tool holder 2 having the above-described components, the coupling part 34 of the tapered shank 10 is first inserted into the coupling part 44 of the tool holder body 11, and the coupling parts 34 and 44 are fixed by means of welding, brazing, or bonding with an adhesive. At this time, in the same manner as in Embodiment 1, the existence of the guiding parts 35 and 45 allows the tool holder body 11 and the tapered shank 10 to move in concert with each other and causes the tool holder body 11 to be placed concentrically with the tapered shank 10 so that the concentric arrangement is maintained. Accordingly, the tool holder body 11 is coupled to the tapered shank 10 securely and with a high degree of precision.

Regarding this coupling, it is desirable that the coupling part 34 is fixed at a position on the tool holder body 11 side, that is, at a maximum distance from the machine tool spindle 100 side (see FIG. 3). This enables the tapered shank 10 to more easily contract its diameter by means of elastic deformation.

As described above, the tool holder of this invention is structured in such a manner that the tapered shank and the tool holder body are coupled to each other in the state where a part of the tapered shank is inserted in the tool holder body. Accordingly, the tool holder body can be coupled to the tapered shank regardless of the size of the outside diameter of the tool holder body. Since the tool holder body and the tapered shank are formed as separate units, it is possible to use optimal materials for the tapered shank and the tool holder body respectively. Moreover, since it is possible to cause the elastic deformation of the tapered shank effectively, it is possible to securely attach the tool holder to the machine tool spindle. Furthermore, since the tapered shank and the tool holder body are coupled securely to each other, for example, even if centrifugal force generated by high-speed rotation acts on them, such centrifugal force will have no adverse effect on the integrated state of the tapered shank and the tool holder body, thereby enabling excellent coupling.

What is claimed is:

1. A tool holder comprising:
   a tapered hollow shank mountable to a machine tool spindle, the tapered hollow shank having a tapered part and an end part; and
   a tool holder body coupled to the tapered shank;
   wherein the tapered shank and the tool holder body are coupled to each other in the state where the end part of the tapered shank is inserted into the tool holder body, the tapered part having a wall thickness that permits contraction of the tapered hollow shank by elastic deformation of the tapered part upon mounting to the machine tool spindle, the wall thickness being substantially uniform along a section of the tapered part;

further wherein an end part of the tapered hollow shank, being continuous with and extending from a largest diameter part of the tapered hollow shank, and the tool holder body are coupled.

2. The tool holder according to claim 1, wherein a coupling part for coupling the tool holder body to the tapered shank comprises a guiding part for positioning the tool holder body relative to the tapered shank and an attaching part for attaching the tool holder body to the tapered shank.

3. The tool holder according to claim 2, wherein the attaching part comprises:
a first screw part formed on the inner surface of the tool holder body; and
a second screw part integrally formed on the outer surface of the tapered shank for engaging with the first screw part.

4. The tool holder according to claim 2, wherein the attaching part comprises a permanent connection between the tapered shank and the tool holder body.

5. The tool holder according to claim 4, wherein the permanent connection comprises a welded or brazed connection.

6. The tool holder according to claim 1, wherein a coupling part for coupling tile tool holder body to the tapered shank comprises a guiding part for positioning the tool holder body relative to the tapered shank and an attaching part for attaching the tool holder body to the tapered shank, and
wherein the guiding part is located on the tapered shank insertion side of the tool holder body, and the attaching part is located at a position on the inner surface of the tool holder body further away from the tapered shank insertion side compared to the guiding part.

7. The tool holder according to claim 1, wherein a coupling part for coupling the tool holder body to the tapered shank comprises a guiding part for positioning the tool holder body relative to the tapered shank and an attaching part for attaching the tool holder body to the tapered shank, and
wherein the attaching part comprises: a first screw part formed on the inner surface of the tool holder body; and a second screw part formed on the outer surface of the tapered shank for engaging with the first screw part.

8. The tool holder according to claim 1, wherein a coupling part for coupling the tool holder body to the tapered shank comprises a guiding part for positioning the tool holder body relative to the tapered shank and an attaching part for attaching the tool holder body to the tapered shank,
wherein the guiding part is located on the tapered shank insertion side of the tool holder body, and
wherein the attaching part is located at a position on the inner surface of the tool holder body further away from the tapered shank insertion side compared to the guiding part, and comprises: a first screw part formed on the inner surface of the tool holder; and a second screw part formed on the outer surface of the tapered shank for engaging with the first screw part.

9. The tool holder according to claim 1, wherein a coupling part for coupling the tool holder body to the tapered shank comprises a guiding part for positioning the tool holder body relative to the tapered shank and an attaching part for attaching the tool holder body to the tapered shank, and
wherein at least a part of the coupling part of the tapered shank is fixed to the coupling part of the tool holder body.

10. The tool holder according to claim 1, wherein a coupling part for coupling the tool holder body to the tapered shank comprises a guiding part for positioning the tool holder body relative to the tapered shank and an attaching part for attaching the tool holder body to the tapered shank, and at least a part of the coupling part of the tapered shank is fixed to the coupling part of the tool holder body, and
wherein the guiding part is located on the tapered shank insertion side of the tool holder body, and the attaching part is located at a position on the inner surface of the tool holder body further away from the tapered shank insertion side compared to the guiding part.

11. The tool holder according to claim 1, wherein a coupling part for coupling the tool holder body to the tapered shank comprises a guiding part for positioning the tool holder body relative to the tapered shank and an attaching part for attaching the tool holder body to the tapered shank, and at least a part of the coupling part of the tapered shank is fixed to a coupling part of the tool holder body,
wherein the guiding part is located on the tapered shank insertion side of the tool holder body, and
wherein the attaching part is located at a position on the inner surface of the tool holder body further away from the tapered shank insertion side compared to the guiding part and comprises: a first screw part formed on the inner surface of the tool holder body; and a second screw part formed on the outer surface of the tapered shank for engaging with the first screw part.

12. The tool holder according to claim 1, wherein the material for the tapered shank is different from the material for the tool holder body.

13. The tool holder according to claim 1, wherein a coupling part for coupling the tool holder body to the tapered shank comprises a guiding part for positioning the tool holder body relative to the tapered shank and an attaching part for attaching the tool holder body to the tapered shank, and
wherein the material for the tapered shank is different from the material for the tool holder body.

14. The tool holder according to claim 1, wherein a coupling part for coupling the tool holder body to the tapered shank comprises a guiding part for positioning the tool holder body relative to the tapered shank and an attaching part for attaching the tool holder body to the tapered shank,
wherein the guiding part is located on the tapered shank insertion side of the tool holder body, and the attaching part is located at a position on the inner surface of the tool holder body further away from the tapered shank insertion side compared to the guiding part, and
wherein the material for the tapered shank is different from the material for the tool holder body.

15. The tool holder according to claim 1, wherein a coupling part for coupling the tool holder body to the tapered shank comprises a guiding part for positioning the tool holder body relative to the tapered shank and an attaching part for attaching the tool holder body to the tapered shank,
wherein the guiding part is located on the tapered shank insertion side of the tool holder body,
wherein the attaching part is located at a position on the inner surface of the tool holder body further away from the tapered shank insertion side compared to the guiding part and comprises: a first screw part formed on the inner surface of the tool holder body; and a second screw part formed on the outer surface of the tapered shank for engaging with the first screw part, and wherein the material for the tapered shank is different from the material for the tool holder body.

16. The tool holder according to claim 1, wherein a coupling part for coupling the tool holder body to the tapered shank comprises a guiding part for positioning the tool holder body relative to the tapered shank and an attaching part for attaching the tool holder body to the tapered shank, and at least a part of the coupling part of the top end shank is fixed to the coupling part of the tool holder body, wherein the guiding part is located on the tapered shank insertion side of the tool holder body, wherein the attaching part is located at a position on the inner surface of the tool holder body further away from the tapered shank insertion side compared to the guiding part and comprises: a first screw part formed on the inner surface of the tool holder body; and a second screw part formed on the outer surface of the tapered shank for engaging with the first screw part, and wherein the material for the tapered shank is different from the material for the tool holder body.

* * * * *